United States Patent [19]

Kishima et al.

[11] Patent Number: 4,797,425
[45] Date of Patent: Jan. 10, 1989

[54] METHOD OF PRODUCING POROUS MATERIAL HAVING OPEN PORES

[75] Inventors: Noboru Kishima; Akio Matsumoto, both of Kitakyushu, Japan

[73] Assignee: Toto Ltd., Kitakyushu, Japan

[21] Appl. No.: 92,585

[22] Filed: Sep. 3, 1987

[51] Int. Cl.$^4$ .................................................. C08J 9/28
[52] U.S. Cl. ...................................... 521/64; 521/135; 521/178; 523/403; 523/404; 528/103
[58] Field of Search ................... 521/62, 63, 178, 135, 521/64

[56] References Cited

U.S. PATENT DOCUMENTS

| | | | |
|---|---|---|---|
| 3,265,647 | 10/1957 | Bolson | 523/443 |
| 3,666,695 | 8/1966 | Lundgren et al. | 523/404 |
| 3,669,911 | 6/1972 | Najvar | 521/62 |
| 3,825,506 | 7/1974 | Carter | 521/62 |
| 4,069,202 | 1/1978 | Carey | 523/093 |
| 4,464,485 | 8/1984 | Kishima et al. | 54/128 |

FOREIGN PATENT DOCUMENTS

| | | |
|---|---|---|
| 660982 | 3/1965 | Belgium . |
| 0147494 | 1/1984 | European Pat. Off. . |
| 1327755 | 1/1968 | France . |
| 50-75243 | 6/1975 | Japan . |
| 681108 | 10/1952 | United Kingdom . |

OTHER PUBLICATIONS

Chemical Abstracts vol. 84, No. 10, Mar. 8, 1976, Columbus, OH USA: p. 41, col. 2, Abstract No. 60531t.
Patent Abstracts of Japan vol. 4, No. 12, Jan. 29, 1980 p. 53C71.

*Primary Examiner*—Morton Foelak
*Attorney, Agent, or Firm*—Oblon, Fisher Spivak, McClelland & Maier

[57] ABSTRACT

A method of producing a porous material having open pores comprises the steps of preparing an emulsion slurry by vigorously agitating a mixture comprising a main ingredient, a polyamide hardener, a filler and water, casting said emulsion slurry in a water-impermeable mold, hardening said slurry while it contains the water. The main ingredient is a bisphenol-type epoxy resin added with one or more reactive diluents each having one or more epoxy rings per molecule and added in an amount of 18 to 50 wt %, based on 100 wt % of said bisphenol-type epoxy resin. A large size molded product having a high wet bending strength and a complicated contour can be produced.

6 Claims, No Drawings

METHOD OF PRODUCING POROUS MATERIAL HAVING OPEN PORES

BACKGROUND OF THE INVENTION

The present invention relates to a method of producing a porous material having open pores. More particularly, the invention is concerned with a method of producing a porous material having open pores from a mixture which comprises a main ingredient, a polyamide hardener, a filler and water, the main ingredient comprising a bisphenol-type epoxy resin added with one or more reactive diluents each having one or more epoxy rings per molecule and added in an amount of 18 to 50 wt% based on 100 wt% of the bisphenol-type epoxy resin.

Hitherto, for producing a porous material having open pores for use as a filtering medium, air diffusion medium, casting mold, carrier for catalyst and so forth, various methods have been proposed such as sintering of metal powder, sintering of powdered thermoplastic resin, sintering of inorganic powder, hydration setting of cement or the like, pressing or stamping of a mixture of thermosetting resin and filler, hardening of a resin liquid containing pore-forming agent followed by the removal of the pore-forming agent by dissolving, extraction or evaporation, use of a foaming agent, and polymerization for hardening of a W/O emulsion of, for example, a polyester resin followed by evaporation of water from the hardened mass.

These known methods of producing porous material having open pores, however, encountered one or more of the following problems in connection with the manufacturing process. First of all, it is to be pointed out that these known methods impractically limit or restrict the shape and size of the product. In addition, these methods often require a heat treatment at high temperature, as well as press work at high pressure. The method which makes use of the pore-forming agent require a step of heating or vacuum operation for the removal of the pore-forming agent by evaporation. Furthermore, these known methods have disadvantages in that it is difficult to control the pore size or pore diameter, or that the production steps involved therein are generally complicated and difficult to conduct.

In order to solve the aforementioned problems and to produce a large scale porour material having open pores and relatively complicated shape, an improved method has been proposed by Japanese Patent Publication No. 2464/1978 whereby a porous material having precise dimensions and open pores of desired diameter can be produced. This improved method disclosed by the prior patent publication comprises the steps of preparing an O/W emulsion slurry from a mixture containing a glycidyl-type epoxy resin, a polymeric fatty acid polyamide hardener, a filler and water, casting the slurry in a waterimpermeable mold, hardening the slurry while it contains water, and dehydrating the hardened mass, whereby the desired object is attained.

U.S. Pat. No. 4,464,485 discloses a method of producing a porous material, which is free from the aforementioned problems and suited for the production of a porous material which may be used as a filtering medium, air diffusion medium or casting mold or so forth, by adjusting the diameter of open pores within the range of from 0.5 to 10 microns. In this known method, the desired object is attained by the use of a bisphenol-type epoxy resin in combination with a special hardener which is either (a) mixture of (i) an amide compound which is obtained through a reaction between a monomeric fatty acid and an ethyleneamine represented by the formula of $H_2N-(cH_2-Ch_2-NH)_n H$ where "n" is 3 to 5, and (ii) a polymeric fatty acid polyamide obtained through a reaction of a polymeric fatty acid and the aforementioned ethyleneamine, or (b) a reaction mixture obtained by mixing reaction of the aforementioned monomeric fatty acid, the aforementioned polymeric fatty acid and the aforementioned ethyleneamine.

However, the porous material having open pores produced by the aforementioned method of casting an emulsion slurry comprising a mixture of a bisphenol-type epoxy resin, a polyamide hardener, a filler and water has a maximum wet bending strength of only about 60 to 70 $kg/cm^2$. When the thus produced porous material is used as a filtering medium, the filtering pressure and back-washing pressure that are repeatedly applied thereto cause cracking since the strength of the filtering medium is low. In addition, since it is required to apply a high pressure in order to increase the filtering speed in consideration of economy, the porous material used as the filtering medium must have a high strength.

It has been tried to decrease the content of water in the slurry thereto to lower the porosity of the hardened porous material, and to increase the strength of the porous material. However, this leads to the following two disadvantages. The first disadvantage is that the viscosity of the slurry is increased as the content of water therein is decreased, with the result that a mold having a complicated shape cannot be fully filled with the slurry at the casting step. The second disadvantage is that the reduction in porosity results in reduction of flow rate of a fluid flowing through the porous material so that an material becomes inferior from the economical point of view.

SUMMARY OF THE INVENTION

Accordingly, the object of this invention is to solve the aforementioned problems and to provide a method of producing a porous material having open pores and having a large size and a complicated shape with highly precise dimensions and high wet bending strength, without causing increase in viscosity of the slurry or reduction in filtering efficiency of the resultant porous material.

The aforementioned object of this invention is attained by the provision of a method of producing a porous material having open pores, comprising the steps of preparing an emulsion slurry by vigorously agitating a mixture comprising a main ingredient, a polyamide hardener, a filler and water, casting said emulsion slurry in a water-impermeable mold, hardening said slurry while it contains the water, wherein the improvement comprises that said main ingredient is a bisphenol-type epoxy resin added with one or more reactive diluents each having one or more epoxy rings per molecule and added in an amount of 8 to 50 wt%, preferably 30 to 45 wt%, based on 100 wt% of said bisphenol-type epoxy resin.

In the conventional methods, as disclosed for example by Japanese Patent Publication No. 2464/1978 and U.S. Pat. No. 4,454,485, no reactive diluent is added to the main epoxy resin component or such a diluent is added only in an amount of about 10 to 18%, based on the weight of the main epoxy resin component, for the purpose of lowering the viscosity of the resin mixture or for the purpose of adjusting the porosity of the hardened material. In general, other than the case of producing a porous material, a reactive diluent is added normally in an amount of 5 to 15 wt% to an epoxy resin component for the purpose of lowering the viscosity of the used epoxy resin, and it is considered that the properties, such as mechanical strength, of the hardened material are deteriorated more or less by the addition of the reactive diluent.

In contrast to the conventional technical knowledge as described above, we have found that the properties including the mechanical strength of a hardened porous material having open pores are improved by the addition of a reactive diluent having one or more epoxy rings per molecule, and the improvement in properties of the hardened mass is enhanced as the added amount of the reactive diluent is increased up to the maximum added amount of 30 to 50 wt%, based on 100 wt% of the main epoxy resin component. Based on this surprising finding, we have investigated the change or improvement in the properties of the hardened porous masses having open pores by using various reactive diluents each having one or more epoxy rings per molecule and by using various combinations thereof. The present invention is accomplished based on the results of our investigations.

DESCRIPTION OF THE INVENTION INCLUDING THE PREFERRED EMBODIMENTS

The present invention provides a method of producing a porous material having open pores, comprising the steps of preparing an emulsion slurry by vigorously agitating a mixture comprising a main ingredient, a polyamide hardener, a filler and water, casting said emulsion slurry in a water-impermeable mold, hardening said slurry while it contains the water, wherein the improvement comprises that said main ingredient is a bisphenol-type epoxy resin added with one or more reactive diluents each having one or more epoxy rings per molecule and added in an amount of 18 to 50 wt%, based on 100 wt% of said bisphenol-type epoxy resin.

It is preferred that the bisphenol-type epoxy resin used in this invention be of liquid form at normal temperature and has a low viscosity so as to enable preparation of a slurry which can be handled easily. Preferable bisphenol-type epoxy resins include bisphenol-A, bisphenol-AD and bisphenol-F type epoxy resins. Particularly preferred are those having an epoxy equivalent of from 160 to 200.

The reactive diluents which may be used in the present invention include epoxy compounds each having one or more epoxy rings per molecule and each having a low viscosity. Examples of preferred epoxy compounds which may be used as the reactive diluent in this invention are monoepoxy reactive diluents such as allylglycidyl ether, butylglycidyl ether, phenylglycidyl ether, butylphenylglycidyl ether, cresylglycidyl ether, 3-(pentadecyl)phenylglycidyl ether, octylene oxide, cyclohexenevinyl monooxide, styrene oxide, dipentent monooxide, pinene oxide and tert-carboxylic acid glycidyl ester; diepoxy reactive diluents such as diglycidyl ether, butanedioldiglycidyl ether, diethyleneglycoldiglycidyl ether, bis(2,3-epoxycyclopentyl) ether, resorcinoldiglycidyl ether, 2-glycidylphenylglycidyl ether, butadiene oxide, dimethylpentane dioxide, limonene dioxide and vinylcyclohexene dioxide; and triepoxy reactive diluents such as trimethylolpropane triglycidyl ether and 2,6-diglycidyl phenylglycidyl ether.

The polyamide hardener used in this invention is a reaction product of a carboxylic acid and a polyamine. Preferable polyamide hardeners are reaction products of monomeric fatty acids and/or polymeric fatty acids with alkylene polyamines.

Particularly preferable monomeric fatty acids are those having 10 to 22 carbon atoms per molecule. More preferable monomeric fatty acids are oleic acid, linoleic acid and a mixture thereof. The preferable polymeric fatty acids are composed mainly of dimer acids which are produced from tallow oleic acid, tall oil fatty acids, soybean oil fatty acid and so forth. Any one or more monomeric fatty acids may be mixed with one or more polymeric fatty acids, and the mixture may be reacted with polyamines to prepare a polyamide hardener. Alternatively, a polyamide hardener mixture may be prepared by adding one or more amide compounds which are obtained by the reactions between monomeric fatty acids and polyamines to one or more polyamides which are obtained separately by the reaction between polymeric fatty acids and polyamines.

Preferable alkylenepolyamines are ethyleneamines represented by the formula of $H_2N-(CH_2-CH_2-NH)_n-H$ where "n" be more preferably 3 to 5. The most preferable alkylenepolyamines are tetraethylenepentamine represented by the aforementioned formula where $n=4$, and pentaethylenehexamine represented by the aforementioned formula where $n=5$.

Any known fillers may be used in the present invention without particular restriction. However, it is preferred that the used filler can be bound by the used glycidyl epoxy resin and that the used filler is an inorganic material which permits control of the particle size, the preferable examples being powders of silica stone and siliceous sand.

The emulsion slurry used in the method of this invention may be added with an amine hardener and/or modified polyamine hardener.

The amine hardener which may be added to the emulsion slurry in this invention is a compound having one or more amine group in one molecule; the preferable examples being primary amine hardeners such as diethylenetriamine, triethylenetetramine, tetraethylenepentamine, pentaethylenehexamine, diethylaminopropylamine, menthenediamine, N-aminoethylpiperazine, m-xylylenediamine, m-phenylenediamine, o-phenylenediamine, diaminodiphenylmethane and diaminodiphenylsulfone; secondary amine hardeners such as N-methylpiperazine, hydroxyethylpiperazine, piperidine, pyrrolidine and morpholine; and tertiary amine hardeners each having an unsaturated ring, such as l-hydroxyethyl-2-heptadecylglyoxalidine, pyridine, pyrazine and quinoline.

The modified polyamine hardener is a hardener prepared by modifying a polyamine hardener having two or more amine groups in one molecule with a modifier. Preferable polyamine hardeners include primary amine hardeners such as diethylenetriamine, triethylenetetramine, tetraethylenepentamine, pentaethylenehexamine, iminobispropylamine, bis(hexamethylene)triamine, dimethylaminopropylamine, m-xylylenediamine, menthenediamine, isophoronediamine, N-aminoethylpiperadine, m-phenylenediamine, diaminodiphenylmethane, diaminodiphenylsulfone; and secondary amine hardeners such as N-methylpiperadine and hydorxyethylpiperadine. Preferable modifiers include epoxy compounds such as allylgcidyl ether, butylglycidyl ether, styrene oxide, propylene oxide, phenylglycidyl ether, cresylglycidyl ether, ethyleneglycol diglycidyl ether, bisphenol-A diglycidyl ether and trimethylolpropane triglycidyl ether; acrylonitrile; and mixtures of phenols with formaldehyde.

It is preferred that the aforementioned amine hardener and/or modified polyamine hardener be added to the emulsion slurry in an amount of not more than 100 parts by weight, based on 100 parts by weight of the polyamide hardener.

The emulsionslurry used in this invention may be added with a hardening accelerator. Preferable hardening accelerators include tertiary amines having aromatic rings, such as benzyldimethylamine, methylbenzyldimethylamine, 2-(dimethylaminomethyl)phenol and 2,4,6-tris(dimehtylaminomethyl)phenol, and salts of tertiary amines and acids, such as a salt of 2,4,6-tris(-dimethylaminomethyl)phenol and 2-ethylhexanoic acid.

Since the porous material having open pores produced in accordance with the method of this invention is prepared by dispersing a filler in an emulstion comprised of a resin and water followed by hardening the emulsion, the emulsion slurry used in this invention may be added with a dispersing agent for stabilizing the suspension of the filler, a surface reforming agent for reforming the surface of the filler to improve the binding affinity thereof at the interface between the resin and the filler, an emulsifier for forming a stable emulsion, and other additives such as surface active agents.

The present invention will now be described more in detail.

Table 1 shows a composition of a slurry prepared by adding 30 wt% of a reactive diluent to 100 wt% of Epikote 828, a typical bisphenol-A type epoxy resin. Run Nos. 1 to 8 in Table 2 show the properties of the hardened porous masses having open pores produced by using various reactive diluents and each having the composition as set forth in Table 1. All of the reactive diluents used in Run Nos. 1 to 8 in Table 2 have epoxy rings. Run No. 9 in Table 2 shows the properties of the hardened porous mass having open pores obtained from a composition to that shown in Table 1 except that the reactive diluent is excluded.

TABLE 1

| Material | Manufacturer | Weight (g) |
| --- | --- | --- |
| Epikote 828 | Yuka Shell Epoxy K.K. | 675 |
| Reactive Diluent | — | 203 |
| Tohmide 245S[1] | Fuji Kasei Kogyo K.K. | 258 |
| TAP[2] | Kayaku Noulli K.K. | 21 |
| Powdered Siliceous Sand | — | 2768 |
| Water | | 1115 |

Note:
[1]Polyamide Hardener
[2]Hardening Accelerator Trade Name of 2,4,6-tris(dimethylaminomethyl)phenol

TABLE 2

| | Reactive Diluent | Wet Bending Strength (kg/cm$^2$) | Percentage Contraction (%) | Average Diameter of Pores (micron) | Viscosity of Slurry (cp) |
| --- | --- | --- | --- | --- | --- |
| No. 1 | sec-Pentylphenolmonoglycidyl Ether | 111 | 0.14 | 1.96 | 15100 |
| No. 2 | p-Cresylglycidyl Ether | 155 | 0.19 | 2.31 | 12800 |
| No. 3 | Polypropyleneglycol Diglycidyl Ether | 97 | 0.36 | 1.18 | 13520 |
| No. 4 | Glycidylphenyl Ether | 141 | 0.29 | 2.33 | 13900 |
| No. 5 | Trimethylolpropane Triglycidyl Ether | 95 | 1.5 | 0.51 | 15600 |
| No. 6 | Styrene Oxide | 190 | 0.01 | 1.66 | 11000 |
| No. 7 | Ethyleneglycol diglycidyl Ether | 92 | 0.41 | 0.88 | 13000 |
| No. 8 | t-Butylphenyl Glycidyl Ether | 127 | 0.07 | 1.88 | 15200 |
| No. 9 | None | 69 | 0.28 | 2.32 | 15600 |

As can be seen from Table 2, the compositions added with 30% of reactive diluents each having one or more epoxy rings per molecule to the bisphenol-type epoxy resin form hardened masses each having a wet bending strength of about 90 to 150 kg/cm$^2$ which is considerably higher than the wet bending strength (69 kg/cm$^2$) of the hardened mass perpared from the composition which is not added with a reactive diluent.

It has been thus found that the strength of a hardened mass is improved by the addition of a reactive diluent having one or more epoxy rings per molecule. In order to learn the interrelation between the added amount of the reactive diluent and the resultant properties and to find a combination of plural diluents by the use of which the percentage contraction at the hardening step is decreased, the following experiments have been conducted.

Table 3 shows the properties of hardened porous masses having open pores produced by using m,p-cresylglycidyl ether (a mixture of -cresylglycidyl ether and p-cresylglycidyl ether mixed in a ratio of about 6:4) as a reactive diluent and by varying the added amount of the m,p-cresylglycidyl ether. In the experiments shown in Table 3, the weight ratios of the components other than Epikote 828 and m,p-cresylglycidyl ether are the same as set forth in Table 1, and the total weight of Epikote 828 plus m,p-cresylglycidyl ether is the same as the total weight of Epikote 828 and the reactive diluent as set forth in Table 1.

TABLE 3

| Experiment No. | The Ratio of Added Reactive Diluent to Epikote 828 (wt %) | Wet Bending Strength (kg/cm$^2$) | Percentage Contraction (%) | Average Diameter of Pores (micron) | Viscosity of Slurry (cp) |
| --- | --- | --- | --- | --- | --- |
| No. 1 | 20 | 120 | 0.15 | 2.28 | 17000 |
| No. 2 | 27 | 140 | 0.19 | 2.31 | 13000 |
| No. 3 | 35 | 161 | 0.20 | 2.61 | 9800 |
| No. 4 | 37 | 174 | 0.21 | 2.84 | 9600 |

TABLE 3-continued

| Experiment No. | The Ratio of Added Reactive Diluent to Epikote 828 (wt %) | Wet Bending Strength (kg/cm²) | Percentage Contraction (%) | Average Diameter of Pores (micron) | Viscosity of Slurry (cp) |
| --- | --- | --- | --- | --- | --- |
| No. 5 | 39 | 190 | 0.26 | 3.12 | 9200 |
| No. 6 | 42 | 156 | 1.01 | 3.32 | 9000 |
| No. 7 | 45 | 129 | 1.52 | 3.41 | 9000 |
| No. 8 | 50 | 111 | 2.21 | 3.42 | 8800 |
| No. 9 | 55 | 203 | 15.0 | 0.38 | 8700 |

As can be seen from Table 3, the wet bending strength of the hardened masses are increased gradually as the added amount of m,p-cresylglycidyl ether to Epikote 828 is increased up to about 39 wt%. When the added amount of m,p-cresylglycidyl ether exceeds 39 wt%, the wet bending strength is lowered and the percentage contraction is increased. When the added amount of m,p-cresylglycidyl ether reaches 55 wt%, the percentage contraction abruptly increases due to separation of water from the slurry and the diameter of the pores decreases to an extent that it becomes hard to use the resultant hardened mass as a porous material.

The effect obtainable by varying the combination of plural reactive diluents will be demonstrated by referring to the combination of m,p-cresylglycidyl ether and styrene oxide. Table 5 shows the properties of hardened porous masses having open pores produced from the composition as set forth in Table 4, the mixing ratio of the two reactive diluents being varied as set forth in Table 5.

TABLE 4

| Material | Weight (g) |
| --- | --- |
| Epikote 828 | 605 |
| Mixture of m,p-Cresylglycidyl Ether and Styrene Oxide | 236 |
| Tohmide 245S | 248 |
| TAP | 20 |
| Powdered Siliceous Sand | 3040 |
| Water | 1189 |

TABLE 5

| Run No. | Mixing Ratio by Weight of m,p-Cresylglycidyl Ether to Styrene Oxide | Wet Bending Strength (kg/cm²) | Percentage Contraction (%) | Average Diameter of Pores (micron) | Viscosity of Slurry (cp) |
| --- | --- | --- | --- | --- | --- |
| No. 1 | 100:0 | 190 | 1.0 | 5.49 | 10600 |
| No. 2 | 87.5:12.5 | 165 | 0.37 | 4.38 | 10600 |
| No. 3 | 75:25 | 171 | 0.33 | 4.21 | 10000 |
| No. 4 | 62.5:37.5 | 170 | 0.1 | 3.04 | 9800 |
| No. 5 | 50:50 | 142 | 0.02 | 2.95 | 9400 |

As will be seen from Table 5, the percentage contraction can be decreased by substituting a portion of m,p-cresylglycidyl ether with styrene oxide.

In order to demonstrate the effect obtainable by the addition of a surface reforming agent, Table 6 shows the results of experiments wherein the surface of siliceous sand powders are reformed by the addition of γ-aminopropyltriethoxysilane which is a silane coupling agent. When it is desired to mold a porous material block having sharp corners, it is required that the cracking at the corner portions be as little as possible. Meantime, the "cracking at the corner portions" set forth in Table 6 means the cracking formed due to tensile stress at the corner portions at the step of hardening the slurry.

TABLE 6

| | Comparative Example | Example No. 1 | Example No. 2 |
| --- | --- | --- | --- |
| Used Materials (g) | | | |
| Epikote 828 | 605 | 605 | 605 |
| m,p-Cresylglycidyl Ether | 189 | 189 | 189 |
| Styrene Oxide | 47 | 47 | 47 |
| Tohmide 245S | 248 | 248 | 248 |
| TAP | 20 | 20 | 20 |
| Siliceous Sand Powder | 3040 | 3040 | 3040 |
| Water | 1189 | 1189 | 1189 |
| γ-Aminopropyltriethoxysilane | — | 15 | 30 |
| Cracking at Corner Portions | Much cracking found | Little cracking | No cracking |

As will be seen from the results set forth in Table 6, the cracking formed at the corner portions during the hardening step due to tensile stress can be suppressed by the addition of a surface reform agent.

The present invention will now be described more specifically with reference to examples thereof.

EXAMPLES

Each of the compositions as set forth in Table 7 was put into a stainless steel container having no lid, and vigorously agitated at room temperature for 10 minutes to obtain a uniform emulsion slurry. The emulsion slurry was cast in a proper water-impermeable mold and the mold was covered to prevent water from evaporating. The covered mold was allowed to stand for 20 hours in a room maintained at 25° to 30° C. to harden the slurry contained in the mold while water was kept in the slurry. The hardened mass was then removed from the mold and put into a drier maintained at 50° C. for 24 hours to evaporate water contained in the hardened mass, whereby a porous molded product having open pores was produced. The properties of the finished porous molded product are shown in Table 8. In Tables 7 and 8, comparative Example was produced in accordance with a prior art technology (See U.S. Pat. No. 4,464,485), and Examples 1 to 11 were produced in accordance with the method of this invention.

TABLE 7

| Starting Material | Comparative Example (g) | Examples of the Invention | | | | | | | | | | |
|---|---|---|---|---|---|---|---|---|---|---|---|---|
| | | 1 (g) | 2 (g) | 3 (g) | 4 (g) | 5 (g) | 6 (g) | 7 (g) | 8 (g) | 9 (g) | 10 (g) | 11 (g) |
| Epikote 815*1 | 648 | | | | | | | | | | | |
| Epikote 828 | | 641 | 605 | 530 | | | | | 530 | 530 | | |
| Epikote 807*2 | | | | | 545 | 545 | | | | | | |
| Epomik R710*3 | | | | | | | 542 | 542 | | | 542 | 542 |
| Glycydylphenyl Ether | | 237 | | | | 143 | | 143 | | | | 163 |
| m,p-Cresylglycidyl Ether | | | 177 | 140 | 163 | | 163 | | 140 | 140 | 163 | |
| Styrene Oxide | | | | 47 | | 20 | | 20 | 47 | 47 | | |
| t-Butylphenylglycidyl Ether | | | 59 | | | | | | | | | |
| Polyamide Hardener A*4 | 218 | 258 | 248 | 225 | 242 | 242 | 245 | 245 | 169 | 214 | 220 | 220 |
| m-Xylylenediamine*5 | | | | | | | | | | 11 | | |
| Diaminodiphenylmethane*5 | | | | | | | | | 56 | | | |
| Fujicure 5003*6 | | | | | | | | | | | 25 | |
| Epicure Z*7 | | | | | | | | | | | | 25 |
| TAP | 18 | 21 | 20 | 18 | 20 | 20 | 20 | 20 | 18 | 18 | 20 | 20 |
| Siliceous Sand Powder*8 | 2799 | 2768 | 3040 | 2865 | 2889 | 2889 | 2889 | 2889 | 2865 | 2865 | 2889 | 2889 |
| Water | 1352 | 1115 | 1189 | 1226 | 1237 | 1237 | 1237 | 1236 | 1226 | 1226 | 1237 | 1237 |
| γ-Aminopropyltriethoxy silane | | | | 29 | | | | | 15 | 15 | | |

*1Bisphenol-A type epoxy resin (produced by Yuka Shell Epoxy K.K.)
*2Bisphenol-F type epoxy resin (produced by Yuka Shell Epoxy K.K.)
*3Bisphenol-AD type epoxy resin (produced by Mitsui Petrochemical Ind., K.K.)
*4A product prepared by mixing the following components and reacting them in an $N_2$ atmosphere for 2 hours at the room temperature to 230° C. and then further for an additional 2 hours at 230 to 240° C.
Oleic Acid (Monomeric Fatty Acid)    29.9 wt %
Dimer Acid (Polymeric Fatty Acid)    29.9 wt %
Tetraethylenepentamine (Ethyleneamine)    40.2 wt %
*5Amine hardener.
*6A Modified polyamine hardener (produced by Fuji Kasei Kogyo K.K.)
*7A modified polyamine hardener (produced by Yuka Shell Epoxy K.K.)
*890% of the volume was accounted for by particles having particle diameters of not more than 10 microns.

TABLE 8

| | Wet Bending Strength(1) (kg/cm²) | Percentage Contraction(2) (%) | Air Permeability(3) (l/min) | Viscosity of Slurry(4) (cp) |
|---|---|---|---|---|
| Comparative Example | 66 | 0.23 | 3.8 | 7800 |
| Example 1 | 135 | 0.25 | 3.1 | 9400 |
| Example 2 | 143 | 0.20 | 3.3 | 9200 |
| Example 3 | 141 | 0.25 | 3.8 | 8000 |
| Example 4 | 148 | 0.27 | 3.4 | 8000 |
| Example 5 | 140 | 0.20 | 3.1 | 8100 |
| Example 6 | 133 | 0.24 | 3.2 | 8100 |
| Example 7 | 128 | 0.19 | 2.9 | 8100 |
| Example 8 | 126 | 0.18 | 4.8 | 8700 |
| Example 9 | 143 | 0.18 | 4.0 | 8500 |
| Example 10 | 138 | 0.20 | 4.1 | 7700 |
| Example 11 | 133 | 0.20 | 4.0 | 7900 |

The properties set forth in Table 8 were determined by the following test methods.

(1) Wet bending Strength:

A 15 mm×15 mm×120 mm polyvinylchloride case was used as the water-impermeable mold, and the hardened mass was saturated with water to be used as a test piece. The test piece was subjected to a bending test conducted at a span distance of 100 mm and a head speed of 2.5 mm/min.

(2) Percentage Contraction:

An FRP case having a size of 50 mm (length) x 50 mm (width)×500 mm (height) and having contraction marks formed at 450 mm intervals was used as the water-impermeable mold. The hardened product was taken out of the case, and the heightwise linear contraction rate was measured from the contraction marks left on the hardened porous material. The percentage contraction was calculated from the thus measured contraction rate.

(3) Air Permeability:

A polyvinylchloride case having a size of 60 mmφ×20 mm (height) was used as the water-impermeable mold in which the slurry was cast to obtain a hardened product. The hardened product was saturated with water, and an air pressure of 2 kg/cm² was applied through the hardened product saturated with water. The flow-rate of air after the lapse of 5 minutes was measured to find the air permeability.

(4) Viscosity of the Slurry:

The viscosity of the slurry just after the completion of agitation was measured by using a B-type viscometer (No. 4 rotor, 30 rpm) to find the viscosity of each slurry.

As can be seen from the results shown in Table 7 and 8, the wet bending strength of the hardened product produced in each of Examples 1 to 11 was improved by more than about 2 times over that of the Comparative Example without causing increase in percentage contraction, reduction in air permeability or increase in viscosity of the used slurry.

A porous molded product having open pores and having a large size and complicated shape with good accuracy in dimension and a high wet bending strength can be produced, according to the method of this invention, without causing disadvantageous problems such as increase in viscosity of the used slurry seriously or reduction in air permeability of the hardened product.

What is claimed:

1. A method of producing a porous material having open pores, comprising the steps of preparing an emulsion slurry by vigorously agitating a mixture comprising a main ingredient, a polyamide hardener, a filler and water, casting said emulsion slurry in a water-impermeable mold, hardening said slurry while it contains the water, wherein the improvement comprises that said main ingredient is a bisphenol epoxy resin added with one or more reactive diluent each having one or more epoxy rings per molecule and added in an amount of 27–50 wt %, based on 100 wt % of said bisphenol epoxy resin.

2. A method of producing a porous material according to claim 1, wherein said polyamide hardener is either (a) a mixture of (i) an amide compound which is obtained through a reaction between a monomeric fatty acid and anethyleneamine represented by the formula of $H_2N-(CH_2-CH_2NH)_n-H$ where "n" is 3 to 5, and (ii) a polymeric fatty acid polyamide obtained through a reaction of a polymeric fatty acid and said ethyleneamine, or (b) a reaction mixture obtained by mixing reaction of said monomeric fatty acid, said polymeric fatty acid and said ethyleneamine.

3. A method of producing a porous material according to claim 1, wherein said mixture further comprises an additional hardener selected from the group consisting of amine hardeners, modified polyamine hardeners and mixture thereof.

4. A method of producing a porous material according to claim 1 or 3, wherein said mixture further comprises a hardening accelerator.

5. A method of producing a porous material according to claim 1, or 3 wherein said mixture further comprises a surface reformer.

6. A method of producing a porous material according to claims 1 or 3, wherein the reactive diluent comprises a mixture of m-cresylglycidyl ether, p-cresylglycidyl ether and styrene oxide.

* * * * *